(12) United States Patent
Panek et al.

(10) Patent No.: US 9,826,587 B2
(45) Date of Patent: Nov. 21, 2017

(54) CONTROL OF ELECTRICALLY EFFICIENT LED ARRAYS

(71) Applicant: ProPhotonix Limited, Salem, NH (US)

(72) Inventors: Peter Panek, Douglas (IE); Philip O'Carroll, Cork (IE)

(73) Assignee: ProPhotonix Limited, Salem, NH (US)

( * ) Notice: Subject to any disclaimer, the term of this patent is extended or adjusted under 35 U.S.C. 154(b) by 0 days.

(21) Appl. No.: 15/330,831

(22) Filed: Nov. 7, 2016

(65) Prior Publication Data

US 2017/0135169 A1  May 11, 2017

Related U.S. Application Data

(60) Provisional application No. 62/251,332, filed on Nov. 5, 2015.

(51) Int. Cl.
*G09G 3/10* (2006.01)
*H05B 33/08* (2006.01)
*H04N 5/225* (2006.01)

(52) U.S. Cl.
CPC ..... *H05B 33/0827* (2013.01); *H05B 33/0815* (2013.01); *H05B 33/0845* (2013.01); *H04N 5/2256* (2013.01)

(58) Field of Classification Search
CPC ..... G06T 15/005; G06T 19/00; G06T 11/001; G06T 11/40; G06T 11/60; G09G 2300/0842; G09G 3/3233; G09G 2320/043; G09G 2300/0861; G09G 2300/0819; G09G 2320/023; G09G 3/3648; G09G 3/3688; G09G 3/3611; G09G 5/006; G09G 2310/027; G09G 3/3677; G09G 3/29; G09G 3/3216; G09G 3/3266; G09G 2330/021; G11C 19/28
USPC ..................................... 315/169.2
See application file for complete search history.

(56) References Cited

U.S. PATENT DOCUMENTS

| | | | |
|---|---|---|---|
| 6,211,626 | B1 | 4/2001 | Lys et al. |
| 7,071,908 | B2 | 7/2006 | Guttag et al. |
| 7,317,288 | B2 | 1/2008 | Lin et al. |
| 8,154,223 | B2 | 4/2012 | Hsu et al. |
| 8,421,365 | B2 | 4/2013 | Kong et al. |
| 8,618,738 | B2 | 12/2013 | Wen et al. |
| 8,760,301 | B2 | 6/2014 | Savage, Jr. |
| 8,796,931 | B2 | 8/2014 | Savage, Jr. |
| 2008/0180414 | A1 | 7/2008 | Fung et al. |
| 2014/0115302 | A1 | 4/2014 | Higham et al. |
| 2014/0253562 | A1 | 9/2014 | Yaras |

(Continued)

FOREIGN PATENT DOCUMENTS

EP  2042983  4/2009

*Primary Examiner* — Minh D A
(74) *Attorney, Agent, or Firm* — Pandiscio & Pandiscio (57) ABSTRACT

An LED lamp comprising: a plurality of LED strings, each LED string comprising a plurality of LEDs; a plurality of constant current circuits for powering the plurality of LED strings, wherein one constant current circuit is provided for each LED string; a plurality of shift registers for controlling the operation of the plurality of constant current circuits, wherein at least one shift register is provided for each LED string; and a microprocessor for supplying timing pulses to the plurality of shift registers for controlling operation of the plurality of constant current circuits, the timing pulses comprising a plurality of serial bit streams.

19 Claims, 8 Drawing Sheets

Serial Shift Register Connections (56) References Cited

U.S. PATENT DOCUMENTS

2014/0333859 A1 11/2014 Zhang et al.
2015/0116379 A1* 4/2015 Lim .................... G09G 3/3406
 345/691

* cited by examiner

FIG. 1

Block diagram of LED backlight electronics

Timing pulses transferred from the microprocessor to the shift registers as a plurality of serial bit streams.

FIG. 3A

Block diagram of microprocessor control of LED string using 16-bit constant current driver Integrated Circuit.

Switcher circuit optimizing voltage required to LED string

CONTROL OF ELECTRICALLY EFFICIENT LED ARRAYS

REFERENCE TO PENDING PRIOR PATENT APPLICATION

This patent application claims benefit of pending prior U.S. Provisional Patent Application Ser. No. 62/251,332, filed Nov. 5, 2015 by ProPhotonix Limited and Peter Panek et al. for CONTROL OF ELECTRICALLY EFFICIENT LED ARRAYS, which patent application is hereby incorporated herein by reference.

FIELD OF THE INVENTION

This invention relates to lighting devices in general, and more particularly to a modular LED lamp (e.g., a backlight) and a current-regulating drive circuit for LED strobe operation that can control individual elements of the LED arrays of the lamp (e.g., the backlight).

BACKGROUND OF THE INVENTION

Machine vision is the technology used to provide imaging-based automatic inspection and analysis for applications such as parts inspection, process control, and robot guidance in industry. Employing the correct lighting is critical to creating a reliable, repeatable machine vision application.

Currently, the light sources commonly applied in machine vision inspection systems include halogen-, fluorescence-, xenon-, LED- and OLED-based lamps. Since the LED has many advantages over other light sources (such as long lifetime, low power consumption, fast response time, low probability of damage, etc.), the LED has been widely adopted in machine vision inspection systems and has gradually replaced other light sources to become the most commonly utilized technology in the market.

Lamps are available in various form factors including area, line, ring and spot lamps. Lamps provide lighting which is often used in machine vision systems for inspecting objects, e.g., to provide a backlight for illuminating an object to be inspected from behind the object (relative to a camera or imager). Such backlights allow features of the object which is to be inspected, especially peripheral features, to be observed more clearly than when the object is illuminated directly (i.e., from the front of the object). By way of example but not limitation, the present invention comprises the provision and use of an electronic engine for an LED backlight. However, it will be appreciated by those skilled in the art that the present invention can also be utilized in other types of lights (e.g., direct light lamps) and in a variety of form factors.

Machine vision systems can only generate high quality images if the lighting used to inspect an object clearly defines the elements of the object which is being inspected. For many applications, the object under inspection is moving at high speed past the camera and lighting apparatus, and/or a high intensity light is required in order to achieve a meaningful measurement of the object being inspected. In these situations, the LED lights are often overdriven by strobe (or pulse) control so as to increase the intensity from the LED light source for a short, defined period of time. This is to ensure successful image capture by the camera system. This requirement for strobe (or pulse) control can add complexity to the design of the LED control circuitry when large numbers of LEDs are required.

In addition, in machine vision, it is sometimes desirable to change the LED pattern profile while strobing as a means to further inspect items. In other words, it is sometimes desirable to select which LEDs will be powered so as to form a desired form factor (e.g., an area lamp, a line lamp, a ring lamp, a spot lamp, etc.). This requires that the user have the ability to individually control the various LEDs used in the lamp, which can further increase the complexity and cost of the LED control circuitry. It is also often desirable to be able to create and store patterns of LED activation for future use, and not be reliant on "factory set" patterns of LED activation. This can be important where a custom-designed LED activation pattern is required by the user.

1. Issues with Large LED Arrays

There is an increasing demand for higher intensity (i.e., brighter), LED-based lamps (e.g., backlights) for use with high speed inspection of a variety of products and materials. This demand has led to the development of large LED array systems comprising hundreds (or even thousands) of individual LEDs. Currently-available LED array systems are typically limited by a variety of issues. By way of example but not limitation, currently-available LED array systems typically cannot address individual LEDs within the large LED arrays, are generally quite large and bulky, are typically complex, are typically inefficient, generally require large power supply units (e.g., in excess of one kilowatt) and are typically very expensive.

In these large LED array systems, the LEDs are typically placed in a series, or in parallel strings, which limits the controllability to individual strings (or "boards") of LEDs. When LEDs are connected in series, brightness-matching is typically maximized, meaning that the variation of brightness of one LED in the series compared to another LED in the series is not visible. The primary disadvantage of using a series configuration is that the output voltages can be very high when large numbers of LEDs are used. Connecting strings of LEDs in parallel will typically reduce the maximum string voltage required, and will also add some fault immunity. However, the disadvantages of using a parallel configuration are power consumption in the balance resistors, non-uniformity of the optical output and lower system efficiency.

There are numerous strategies that can reduce the aforementioned issues, such as matrix-type configurations, but all of these strategies ultimately lead to increases in the size and cost of the LED array system. Furthermore, many of these strategies are inefficient, inasmuch as they draw electrical power even when it is not required, by virtue of being powered continuously. LED array systems that use strobing techniques to reduce the continuous power draw typically require large and expensive power supply units (e.g., >1 kilowatt). This in turn requires the use of expensive (and large gauge) wiring and cabling which limits the flexibility and modularity of the overall LED array system.

Some manufacturers use microcontrollers in the LED array systems in order to manage individual constant current drivers for the LEDs. However, for systems with a large number of LEDs, a single microcontroller is not able to balance the LED currents to the precision that is generally required. Adding a microcontroller for each LED string (i.e., for each group of LEDs) generally leads to an unacceptable rise in costs and an increase in the space required for the LED control circuitry.

Pulse Width Modulation (PWM) is a standard technique for controlling the intensity of light pulses. Instead of increasing or decreasing the brightness of the light by varying the current to the LEDs, the light is rapidly switched on and off in a regular pattern. The intensity of the light is governed by the duty cycle, by varying the proportions of the time that the light is on or off. Maximum intensity (i.e., brightness) is achieved when the light is on 100% of the time, 50% brightness is achieved when the light is on for half the time, etc.

PWM control circuitry is typically created using specialty hardware in an embedded microcontroller unit (MCU). Most MCUs have one or more hardware PWM outputs for such applications. However, for large scale LED arrays, these techniques are not suitable. For example, if an LED array system had 1000 LEDs, each LED would need to be individually controlled by the MCU. Therefore this system would need approximately 1000 separately-controlled PWM outputs for the MCU. PWM can also be effected in software in a loop, turning the light on for a timed period and then turning it off for a timed period. However, in software implementations, the MCU is limited by clock speed and other factors. Therefore, only a relatively small number of PWM outputs can be implemented using software implementations before the limits of the MCU are reached.

Therefore, it would be desirable to provide a modular LED driving and control scheme that can address individual elements of a large array of LEDs at a reasonable cost and which is easily scalable, flexible in design so as to allow for various form factors, and which works independently of device wavelength, device type (e.g., LED, OLED, etc.) or system power requirements, while still allowing the user full control of various strobe profile parameters.

SUMMARY OF THE INVENTION

The present invention comprises the provision and use of a modular LED lamp (e.g., backlight), and more particularly a modular LED lamp (e.g., backlight) comprising a current-regulating drive circuit for an LED strobe drive that can control the individual LEDs of the LED array. The invention uses one central processor which connects via shift register arrays to address each LED in a panel or series of panels. During the LED off-time, a pulse energy charging system is used to minimize the total input current required by the system during operation (i.e., during the LED on-time).

The system is fully modular and flexible. Various types of LEDs, or similar light sources, can be accommodated by the present invention without modifying the system hardware. In order to control the large number of LEDs, complex software structures, based on saturated mathematics, are utilized. For the remainder of this disclosure, only LED-based systems will be discussed. However, it will be apparent to those skilled in the art that the present invention can be utilized in conjunction with other light sources such as OLEDs, SLEDS, etc.

In one preferred form of the invention, there is provided an LED lamp comprising:
  a plurality of LED strings, each LED string comprising a plurality of LEDs;
  a plurality of constant current circuits for powering the plurality of LED strings, wherein one constant current circuit is provided for each LED string;
  a plurality of shift registers for controlling the operation of the plurality of constant current circuits, wherein at least one shift register is provided for each LED string; and
  a microprocessor for supplying timing pulses to the plurality of shift registers for controlling operation of the plurality of constant current circuits, the timing pulses comprising a plurality of serial bit streams.

In another preferred form of the invention, there is provided a novel method for producing light, the novel method comprising:
  providing an LED lamp comprising:
    a plurality of LED strings, each LED string comprising a plurality of LEDs;
    a plurality of constant current circuits for powering the plurality of LED strings, wherein one constant current circuit is provided for each LED string;
    a plurality of shift registers for controlling the operation of the plurality of constant current circuits, wherein at least one shift register is provided for each LED string; and
    a microprocessor for supplying timing pulses to the plurality of shift registers for controlling operation of the plurality of constant current circuits, the timing pulses comprising a plurality of serial bit streams; and
  causing the microprocessor to supply appropriate timing pulses to appropriate ones of the plurality of shift registers so as to activate selected ones of the plurality of LEDs on the plurality of LED strings.

In another preferred form of the invention, there is provided a lamp comprising:
  a plurality of lighting strings, each lighting string comprising a plurality of light sources;
  a plurality of powering circuits for powering the plurality of lighting strings, wherein one powering circuit is provided for each lighting string;
  a plurality of shift registers for controlling the operation of the plurality of powering circuits, wherein at least one shift register is provided for each lighting string; and
  a microprocessor for supplying timing pulses to the plurality of shift registers for controlling operation of the plurality of powering circuits, the timing pulses comprising a plurality of serial bit streams.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The LED Lamp (e.g., Backlight) in General

The present invention provides a series of design innovations to overcome issues with the prior art. This disclosure will primarily discuss the invention in the context of a monochromatic LED backlight configuration. However, it will be appreciated by those skilled in the art that the present invention can be applied to any LED array configuration, e.g., a line light, a ring light, etc. Furthermore, various types of LEDs can be accommodated with the present invention. For example, monochromatic, infrared or ultra-violet (UV) light sources can all be utilized without the need for any changes to the circuit hardware or infrastructure. LED forward voltages, drive currents, pulse widths, durations, etc. are all controlled by software.

Figure 1:
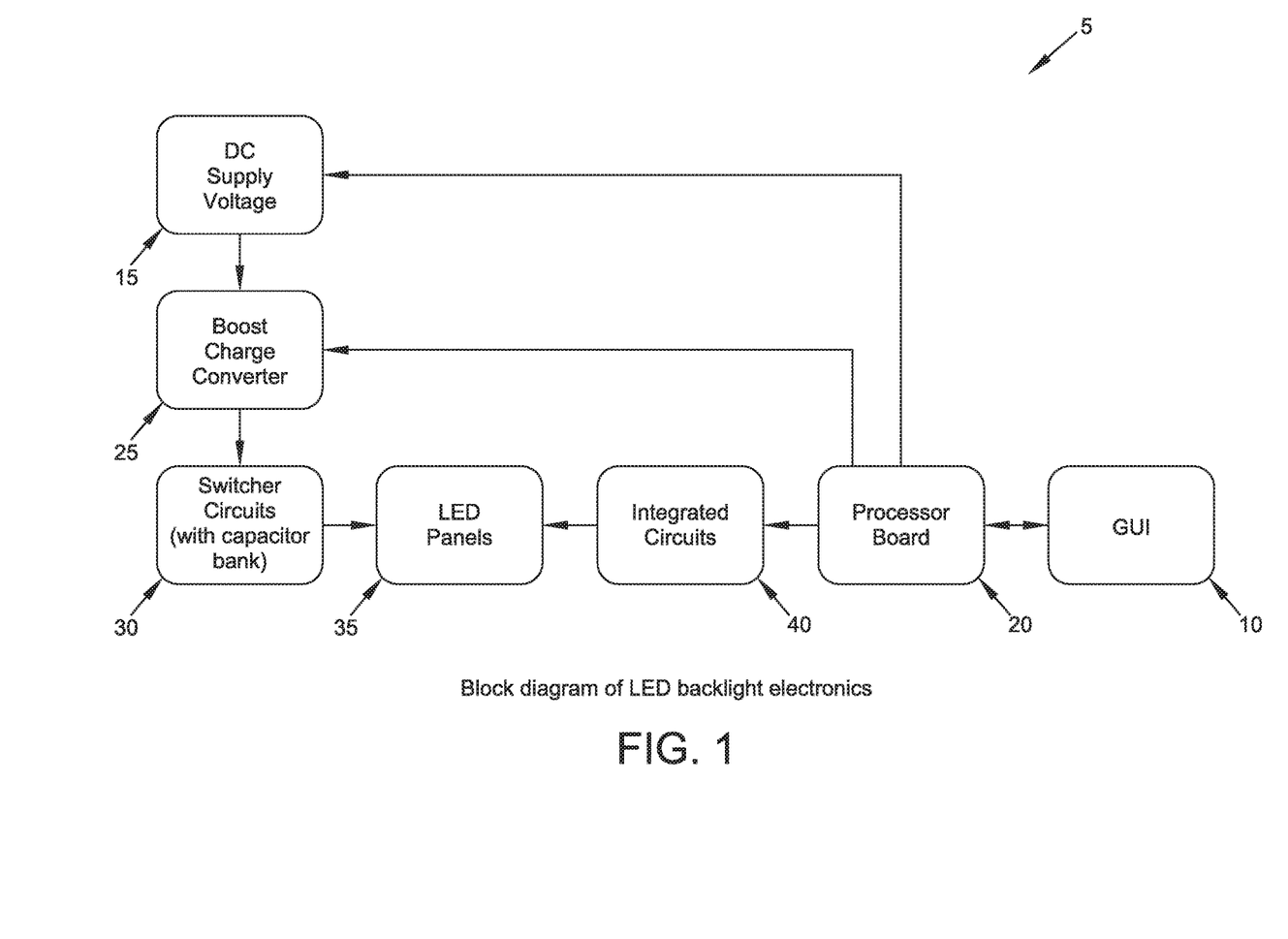
FIG. 1 is a block diagram of the LED lamp (e.g., backlight) electronics used in connection with the present invention.

As shown in FIG. 1, a backlight 5 formed in accordance with the present invention may comprise seven basic elements: a GUI interface 10, a DC power supply 15, a processor printed circuit board (PCB) 20, a boost charge converter PCB 25, a switcher PCB 30 (which includes a capacitor bank, see below), and an LED panel PCB 35 which is driven by integrated circuits (ICs) 40. Backlight 5 can include multiple LED panels 35. It will be appreciated by those skilled in the art that the number of LEDs populating each LED panel 35, and the number of LED panels 35 included in backlight 5, can be easily scaled with the design methodology used in the present invention. For clarity of illustration, the following disclosure will describe in more detail a backlight 5 where only one LED panel 35 is utilized.

Figure 2:
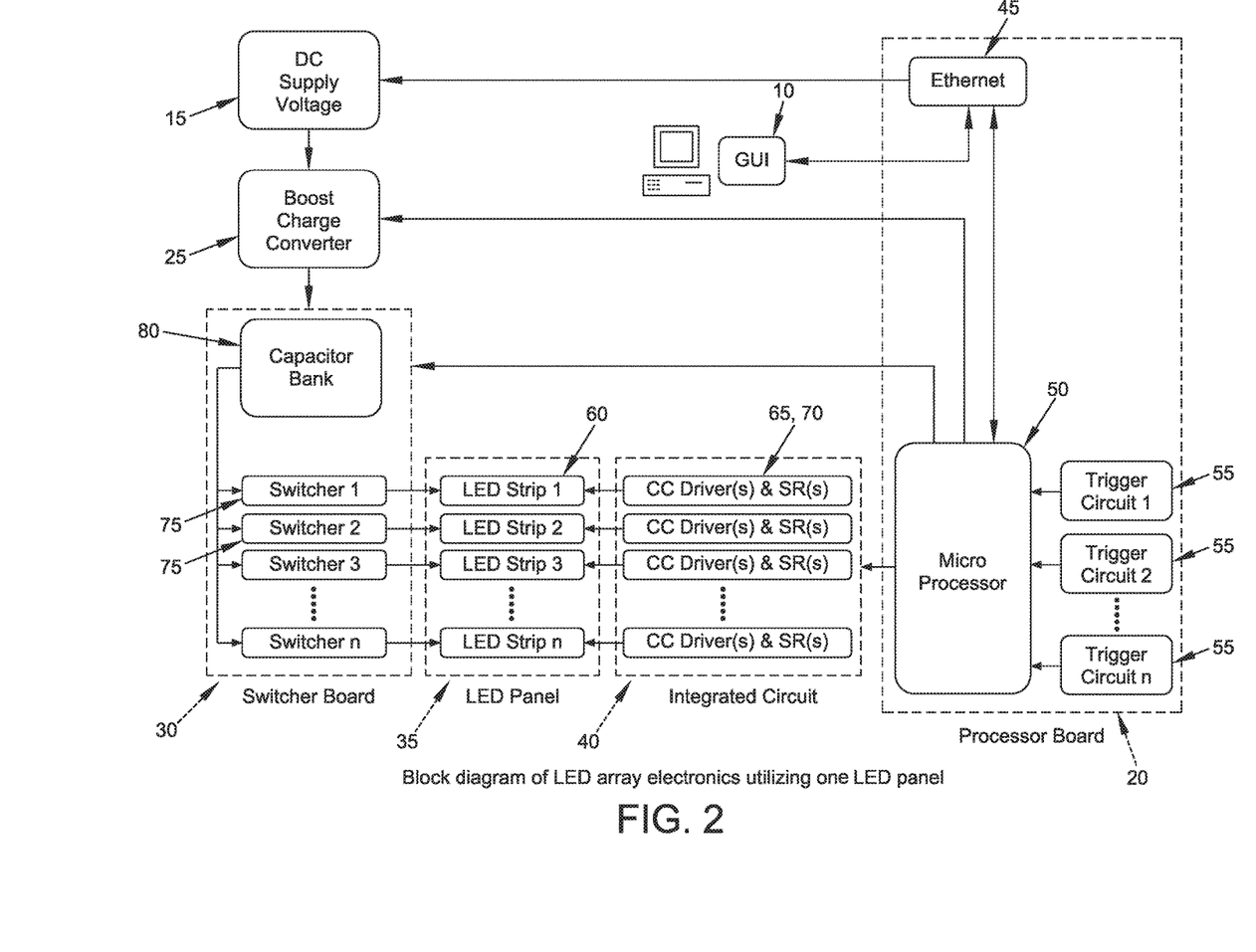
FIG. 2 is a block diagram of the LED array electronics utilizing one LED panel.

FIG. 2 shows further details of an exemplary backlight 5 comprising a single LED panel 35. Backlight 5 is powered by DC power supply 15, for example, a 48V power supply. Custom GUI interface 10 allows the user to control the backlight via an Ethernet connection 45 to the microprocessor 50 located on processor PCB 20. Processor PCB 20 comprises microprocessor 50, Ethernet electronics 45 and one or more trigger circuits 55. Trigger circuits 55 allow strobe light pulses to be synchronized to the machine vision capture system. Trigger schemes can also include direct strobe time period control or user-defined LED display patterns with set intensities and timings.

Microprocessor Control of Each Individual LED

Microprocessor 50 provides full control of IC(s) 40, which mainly comprise shift registers (SRs) and constant current (CC) drivers (see below). Microprocessor 50 connects to, and addresses, every individual LED in LED panel 35 via these shift registers. A single signal (via a bit stream) can be sent from microprocessor 50 into ICs 40 to control multiple LEDs on LED panel 35 (or to control the LEDs on multiple LED panels 35, where multiple LED panels are utilized in backlight 5).

Figure 3A:
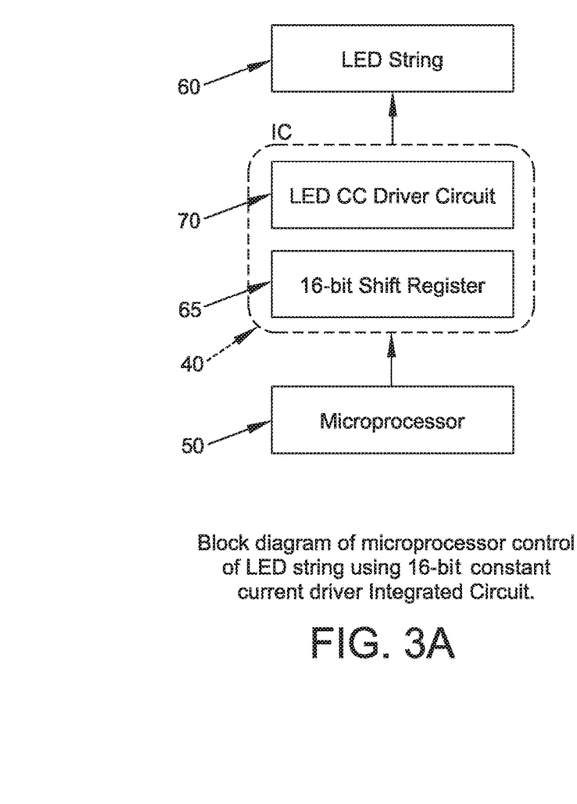
FIG. 3A is a block diagram of the microprocessor control of an LED string using a 16-bit constant current driver integrated circuit.
Figure 3B:
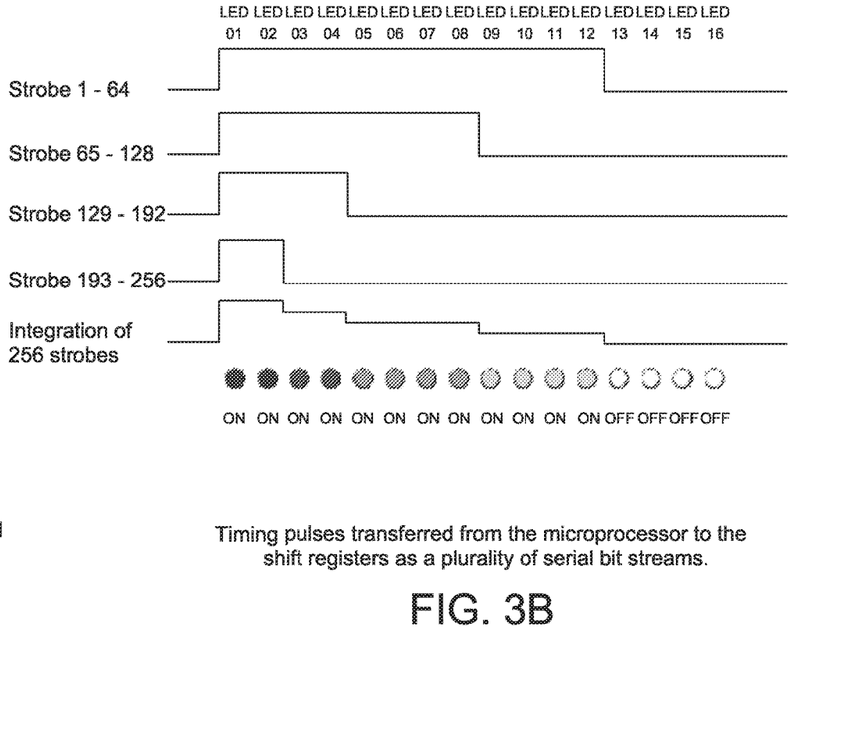
FIG. 3B is a schematic view showing timing pulses transferred from the microprocessor to the shift registers as a plurality of serial bit streams.

On receiving instructions from GUI interface 10, microprocessor 50 communicates with both IC PCB 40 and switcher PCB 30. First, the strobe profile for LED panel 35 is transferred from microprocessor 50 into the shift registers located on IC PCB 40. LED timing pulses are generated from microprocessor 50 as a number of serial bit streams. A typical bit stream profile of an LED string 60 of 16 LEDs is shown in FIGS. 3A and 3B. Microprocessor 50 sends a series of bit streams, one at a time, to a 16-bit shift register 65. Once a bit stream has been fully loaded into shift register 65, the instructions are sent to constant current drivers 70 and the ON or OFF signals are sent out to the 16 LEDs in LED string 60.

The number of bit streams sent from microprocessor 50 to shift registers 65 per millisecond (ms) is determined by the size of microprocessor 50. Using an 8-bit microprocessor 50, a total of 256 (i.e., $2^8$) steps can be transferred per millisecond. Using a 10-bit microprocessor 50, a total of 1024 (i.e., $2^{16}$) steps can be transferred per millisecond.

Assume that the user requires a strobe time of 1 ms. A total of 256 16-bit streams can be sent by microprocessor 50 to the LEDs in LED strings 60 via shift registers 65 within 1 ms. The camera of the machine vision system integrates all 256 steps for that 1 ms, and it is this integration of 256 steps that makes up the strobe profile. Even though the LEDs in LED strings 60 have only two settings (i.e., ON or OFF), the integration by the camera allows for variation in brightness, so the power of each LED is selectable in 255 steps, from 1 (dimmest setting) to 255 (brightest setting). Therefore, the pulse duration can be controlled so as to allow the user to adjust the amount of light integrated by a camera in a machine vision system. The variations in the amount of light generated are achieved by varying the on-time of the LEDs across the 256 steps. In other words, the variations in the amount of light generated by an LED are controlled using a PWM scheme.

By way of example but not limitation, and looking now at FIG. 3B, the 1 ms strobe profile is constructed from 256 separate 16-bit streams where each ON time is 3.9 μs long (1 ms/256). As shown in FIG. 3B, for the first 64 steps, the first 12 LEDs in LED string 60 are turned ON and the remaining LEDs in LED string 60 are left OFF. For the next 64 steps (i.e., steps 65-128), the first 8 LEDs in LED string 60 are turned ON and the remaining LEDs in LED string 60 are left OFF. For the next 64 steps (i.e., steps 129-192), the first 4 LEDs in LED string 60 are turned ON and the remaining LEDs in LED string 60 are left OFF. For the final 64 steps (i.e., steps 193-256), the first 2 LEDs in LED string 60 are turned ON and the remaining LEDs in LED string 60 are left OFF. The resulting 1 ms strobe profile, following camera integration, is a variation in LED brightness from full brightness to minimum brightness from LED 01 to LED 16. It will be appreciated by those skilled in the art that any configuration may be possible using this scheme.

SIMD Processor and Saturated Arithmetic

For an application that requires 1000 LEDs which must be controlled using a PWM scheme with only one transition, each LED is turned on once and turned off once per cycle. The length of time that the LED is "on" is adjusted so as to give the required intensity for each LED. The overall strobe length may be up to 1 ms, and 256 levels of intensity are available per LED. This means that each LED may be turned on or off at any 3.9 μs interval. The number of PWM calculations per second is therefore:

$$(1/3.9 \times 10^{-6}) \times 1000 = 256,410,256$$

For a small MCU (e.g., microprocessor 50) with a 200 MHz clock rate, this is too many calculations to do using standard instructions. By way of example but not limitation, peak performance of this MCU is about 1 operation per clock cycle but each PWM calculation requires at least 8 instructions. Each calculation must read a PWM value, compare it to a time interval and then write the correct value out to the LED output. This means that normal instructions and arithmetic will not suffice for a small microprocessor with this 1000 LED array example.

To this end, the present invention combines a Single Instruction, Multiple Data stream (SIMD) processor and saturated arithmetic to produce a software algorithm which can calculate the 1000 PWM outputs (for the 1000 LEDs in the example) with sub-microsecond precision.

Figure 4A:
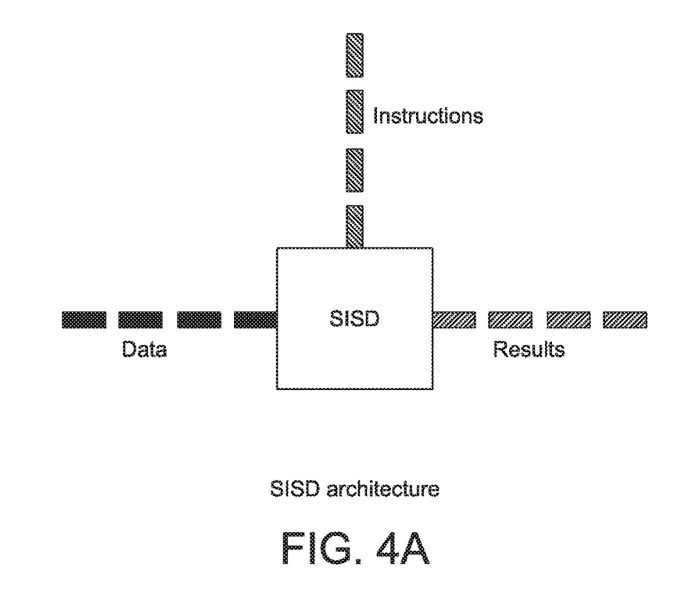
FIGS. 4A and 4B are schematic views showing SISD and SIMD architectures, respectively.

More particularly, and looking now at FIG. 4A, it will be seen that a Single Instruction, Single Data stream (SISD) processor is a sequential computer which exploits no parallelism in either the instruction or data streams. A single control unit fetches a single instruction stream from memory. The control unit then generates appropriate control signals to direct the single processing element to operate on a single data stream (i.e., one operation at a time) and outputs the result.

Figure 4B:
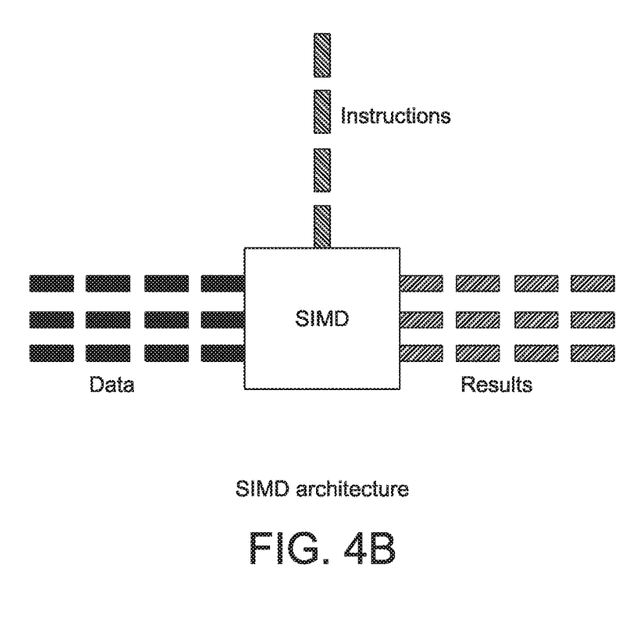

In contrast, and looking now at FIG. 4B, a Single Instruction, Multiple Data stream (SIMD) processor runs the exact same program (that is, the "single instruction" part of the program) on each of its simultaneously-executing parallel units. For example, the ARM Cortex-M4 processor has SIMD instructions which can do up to four arithmetic calculations in one instruction. These SIMD processors are managed using arithmetical operations. Typically, an eight-bit byte can be used to store the values from 0 to 255. With normal arithmetic, adding 1 to the maximum value 255 causes the register to "wrap around" back to 0. Subtracting 1 from 0 causes the register to wrap around back to 255.

An alternative technique is to use saturated arithmetic where there is no "wrap around", i.e., adding two values whose sum exceeds 255 will still yield 255 inasmuch as this is the maximum value allowed (where there is no "wrap around"). The register is said to be "saturated" to 255. Similarly, subtracting a larger value from a smaller value will be saturated to zero (since this is the minimum value allowed where there is no "wrap around" with the register). In essence, when using saturated arithmetic, there is no wrap around for the register.

With the present invention, an SIMD processor and saturated arithmetic are combined (i.e., microprocessor 50 comprises an SIMD processor programmed to use saturated arithmetic in its internal registers) to produce a software algorithm which can calculate 1000 PWM outputs (for the 1000 LEDs in the example) with sub-microsecond precision. Each PWM output is controlled by an 8-bit register value. The PWM value is always odd. Every cycle, bit 0 of the PWM register is written to a single LED. This means that if the register value is odd, the light is on, and if the register value is even, the light is off.

At each cycle, 2 is subtracted from the PWM register. When the PWM value reaches 1, the next subtraction will make the register zero and, when this is written to the LED, the light is turned off (because if the register value is 0, the light is off).

Alternatively, to save storing a new value to the PWM register after each subtraction, on each cycle, a counter value is subtracted from each PWM register. This counter value (i.e., the value subtracted from each PWM register on each cycle) is incremented by 2 on each cycle. When the counter value is greater than the PWM register, the output (i.e., the resultant of the counter value being subtracted from the PWM register) is zero. On all other cycles prior to this one, the output (i.e., the resultant of the counter value being subtracted from the PWM register) is an odd integer. The least significant bit of the output (i.e., the resultant of the counter value being subtracted from the PWM register) indicates whether the output value is odd or even. It is this output value which is written to the General Purpose Input/Output (GPIO) register for microprocessor 50 (see below) to turn the LED on or off.

Figure 5:
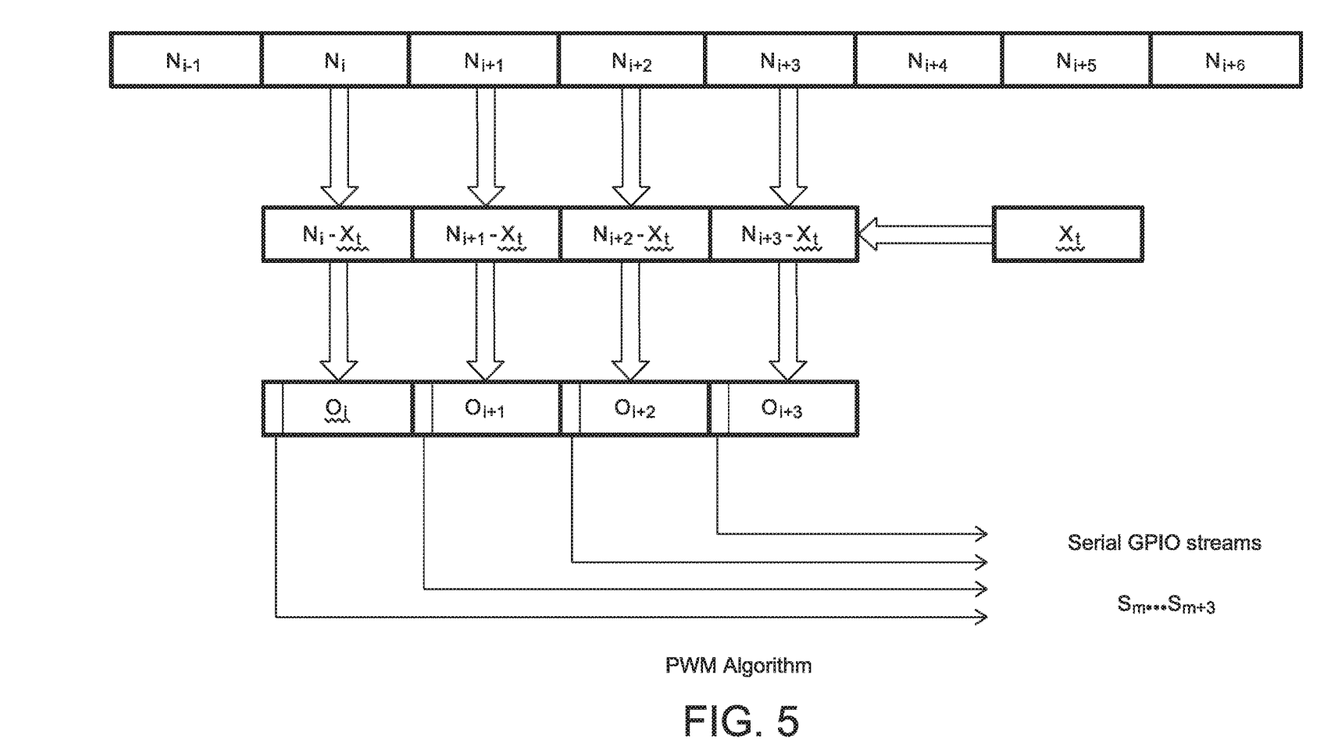
FIG. 5 is a schematic view showing a PWM algorithm.

The SIMD processor (i.e., microprocessor 50) uses the SIMD instructions to do four of these calculations in one operation. In addition, the instructions are carefully arranged so that they pipeline their different phases, allowing microprocessor 50 to do four PWM operations in one clock cycle. The PWM algorithm is shown in FIG. 5. As seen in FIG. 5, 4 bytes of PWM data (labelled $N_i$ to $N_{i+3}$) are fed into a saturated subtraction operation where $X_t$ is subtracted and the result $O_i$ to $O_{i+3}$ used to drive General Purpose Input/Output (GPIO) signals (a generic pin on microprocessor 50) on bit 0 of the result of each subtraction. One operation therefore delivers four bits of the serial stream simultaneously. These results are fed out onto GPIOs feeding serial streams $S_m$ to $S_{m+3}$. These serial streams drive the LEDS via shift registers 65.

Integrated Circuits 40

For lamps (e.g., backlights) where large numbers of LEDs are used, a number of strategies (e.g., the use of larger shift registers, the use of serial shift register connections or the use of parallel shift register connections) may be used to manage LED profiles. See FIGS. 6A and 6B. The choice of strategy to use will depend primarily on the requirements for intensity levels and the allowable time between individual strobes. More particularly, assume that an LED string 60 contains 26 LEDs in series. An IC 40 with a 16-bit shift register 65 will only hold the profiles of 16 LEDs, leaving the profiles of 10 LEDs with nowhere to be stored.

One solution is to use an IC 40 with a larger bit shift register 65, i.e., a 32-bit shift register. However, inputting a shift register with more bits means an increase in the time to input the bit stream into the shift register. This means that the required time between strobe flashes increases.

Figure 6A:
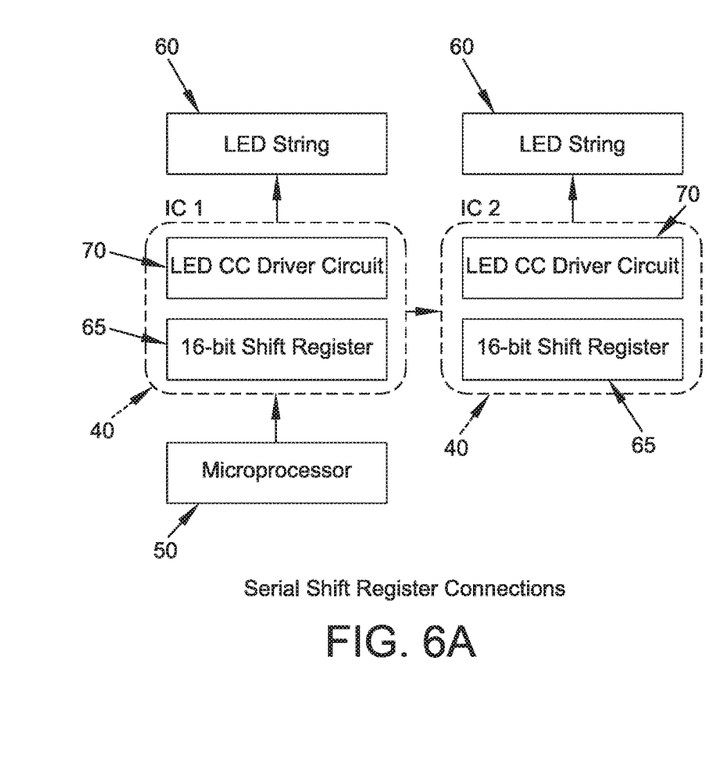
FIG. 6A is a schematic view showing serial shift register connections.
Figure 6B:
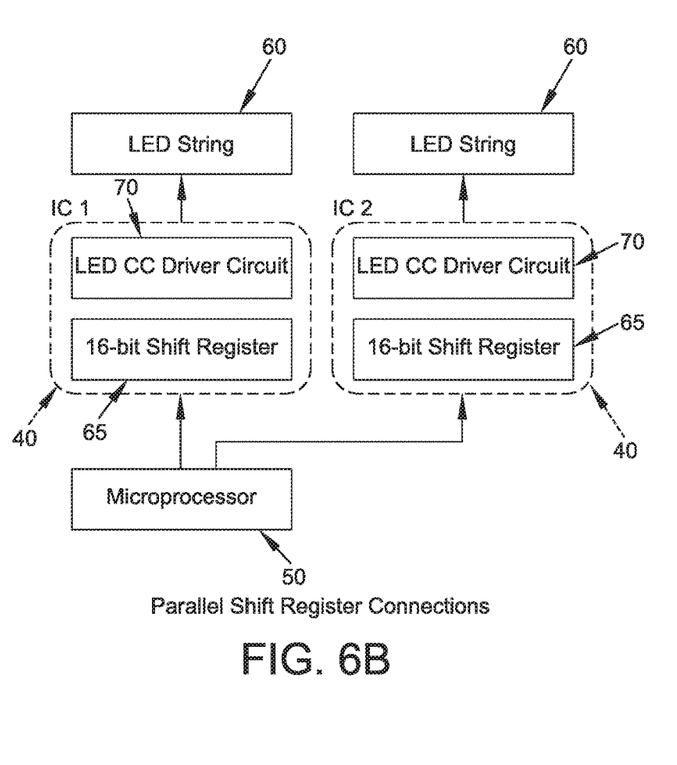
FIG. 6B is a schematic view showing parallel shift register connections.

A second solution is to use two IC's 40 connected together where the first 16 LED profiles are stored in the first integrated circuit (IC1) 40 and the final 10 LED profiles are stored in the second integrated circuit (IC2) 40, as shown in FIG. 6A. Note that in this instance, the bit stream entering IC1 40 is a single bit stream from a single microprocessor channel containing the profiles for all 26 LEDs. Again, the required time between strobe flashes increases.

Another solution is to use, again, multiple ICs 40, but in this instance the bit streams are split up and leave microprocessor 50 from separate channels. See FIG. 6B. For example, the first channel might send a 16-bit stream and the second channel might send a 10-bit stream. In this instance, the time between strobes is optimized by sending the LED profile bit stream via two channels from microprocessor 50 to two ICs 40 (i.e., IC1 and IC2). Utilizing all the available channels in microprocessor 50 and multiple shift registers 65 in multiple ICs 40 allows the user to control a large number of LEDs without requiring an increase in the time between strobe flashes. For example, if a 24-bit "deep" shift register 65 is used in conjunction with microprocessor 50 having 32 parallel outputs, then 768 individual LEDs (i.e., the product of 24×32) can be controlled by the microprocessor output.

For individual LEDs, microprocessor 50 can turn on or off the LEDs at various intensities, pulse duty cycles, voltages and currents via output control signals. Pulse delays can also be programmed if required. Microprocessor 50 can define the pattern from which individual or multiple LEDs are turned on or off. Multiple LED light strobe profiles can be programmed and stored locally (i.e., in the lamp). The system also allows for a particular LED array pattern to be changed in real-time while the system is connected to a camera and a test unit.

Once the entire bit stream profile has been stored in the shift register(s) 65, these pulses are then latched into multiple channel LED constant current drivers 70. Constant current drivers 70 are effectively used as shift registers, the depth of which is usually the same as shift registers 65 (i.e., a 16-bit shift register 65 may be paired with a 16-bit constant current driver 70). Constant current drivers 70 maintain the LED current at a set level. This allows the LED to emit light of the same intensity within the LED bin specification. The LED current can be defined by hardware configuration or via software control. This allows the LEDs to emit light of the same intensity (i.e., brightness) within the LED bin specification.

Switcher PCB 30

At the same time that microprocessor 50 is communicating with IC's 40, it is communicating with switcher PCB 30 (of which the microprocessor has full control). Switcher PCB 30 provides power to an LED panel 35. An LED panel 35 consists of numerous LED strings 60. Switcher PCB 30 can be made up of numerous switcher circuits 75 where each switcher circuit 75 corresponds to an LED string 60. Microprocessor 50 can turn on or off any or all of switcher circuits 75 through a dedicated enable signal. Switcher PCB 30 provides full control of a series of switcher circuits 75 depending on the number of LED strings 60 on LED panel 35—one switcher circuit 75 is provided for each LED string 60.

Switcher PCB 30 also sets the optimum constant current driver working voltage.

Properly powering a light emitting diode (LED) or group of LEDs (e.g., an LED string 60) is different than powering most electronics. While most electronics require a constant voltage source, LEDs require a constant current source. With the large number of LEDs on a backlight, a high instantaneous LED current (e.g., at least 100 A) is required to ensure that all LEDs operate at their maximum intensity when a pulse is applied. Prior art systems have maintained an "always ready" direct LED power supply which requires the use of expensive high power Power Supply Units (PSUs).

In contrast, the present invention provides a novel means for reducing this power requirement while maintaining precision control of the output current driving the LEDs. With the present invention, the LEDs are strobed ON for short time periods. In order to reduce power consumption, and system cost, a pulse energy storage system is utilized via a boost converter circuit (i.e., the aforementioned boost charge converter 25). For the backlight example utilizing a 48V power supply, while the LEDs are off, this pulse energy storage system takes the inputted voltage and current and charges a bank of electrolytic capacitors 80 from 0V to 60V. A series of switcher circuits 75 then takes the variable voltage charge from capacitors 80 and converts it to a constant voltage which can be applied to the LEDs. This charge is sufficient to strobe the LEDs several times.

Figure 7:
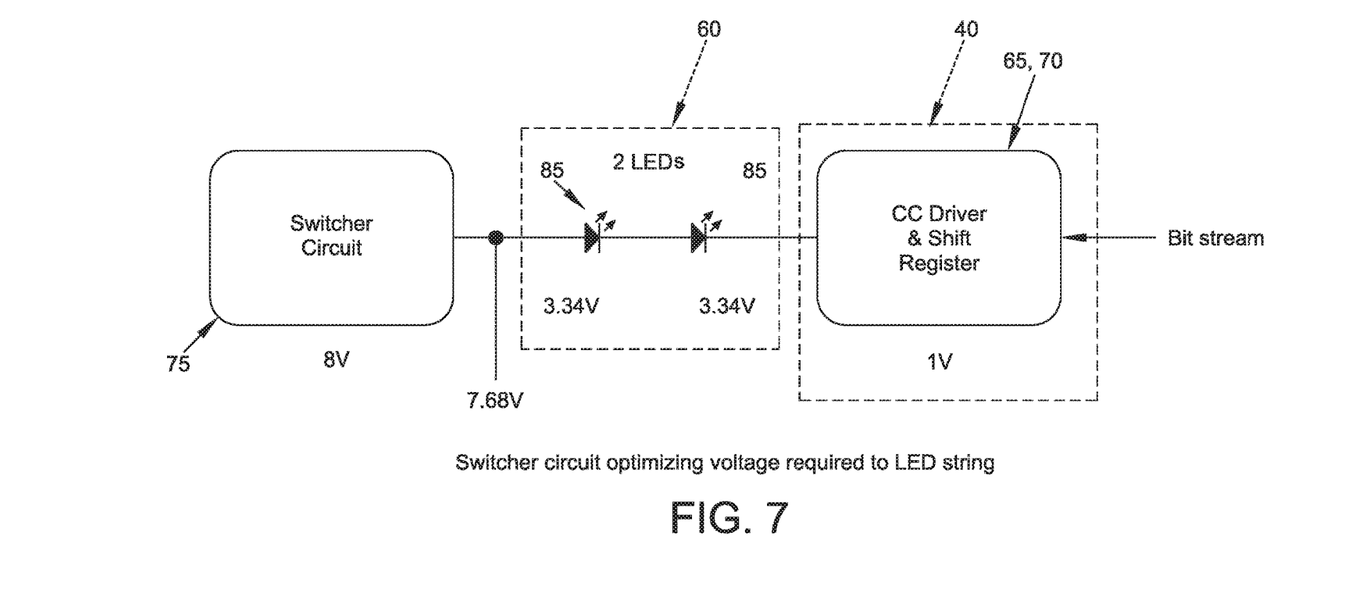
FIG. 7 is a schematic view showing a switcher circuit for optimizing the voltage required for an LED string.
Figure 8A:
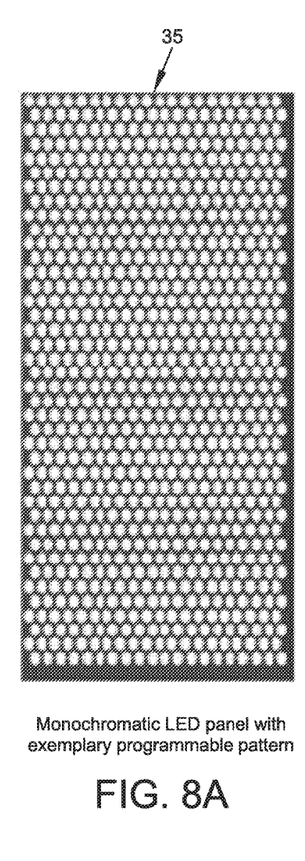
FIGS. 8A-8D are schematic views showing a monochromatic LED panel with exemplary programmable patterns.
Figure 8B:
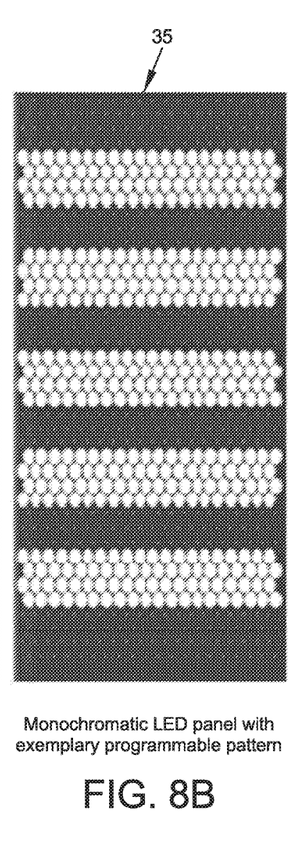
Figure 8C:
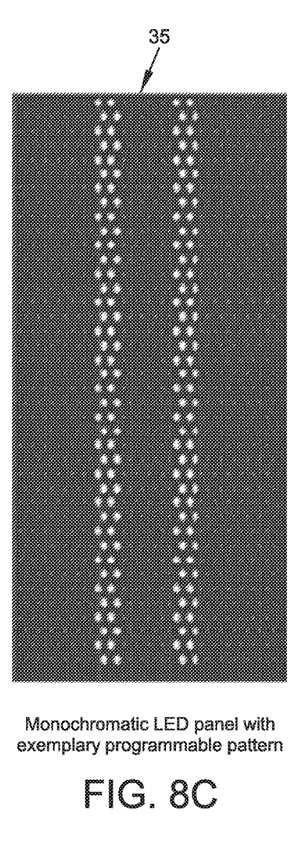
Figure 8D:
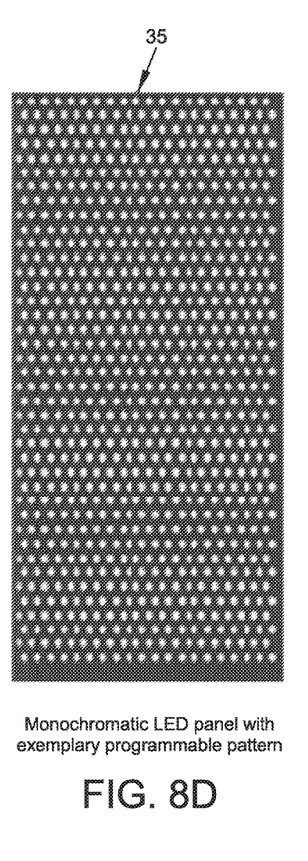

In the example shown in FIG. 7, a switcher circuit 75 is used to optimize the required voltage for an LED string 60 consisting of, in this example, two LEDs 85. Each LED 85 draws down 3.34V volts. It is known that IC 40 draws approximately 1V. Adding this together gives a total voltage requirement for LED string 60 of 7.68V, i.e., ((3.34V×2)+ 1V)=7.68V. Adding some redundancy, an optimum voltage for LED string 60 to draw down would be 8V. Switcher circuit 75 can be controlled to draw down, when required, 8V from boost charger circuit 75 and transfer the appropriate current to LED string 60.

These features greatly reduce the overall system current requirement, for example, from 100 A to as low as 3 or 4 A. This allows for a significant system cost reduction as smaller and cheaper wiring can then be utilized and much smaller power supply units (PSUs) are required. This leads to a much smaller and cost efficient system. This more optimized system can now be reduced to a series of interconnecting modules leading to cost savings in manufacturing and on-going maintenance.

Modular Design

In a further embodiment of the present invention, the entire system can be designed to be modular. For this particular backlight, LED panel 35 comprises seven LED strips 60 of 204 LEDs each. See FIGS. 8A, 8B, 8C and 8D for an exemplary LED panel 35 with exemplary programmable patterns. Each and every LED strip 60 in LED panel 65 is removable and replaceable. Each switcher board 30 comprises seven switcher circuits 75, one switcher circuit 75 per LED strip 60. All switcher boards 30 are removable and replaceable. All PCBs connect neatly to each other using headers which eliminate the need for cabling or soldering. Should any component fail or require replacement, it is a simple task to remove and replace a board.

SOME ASPECTS OF THE PRESENT INVENTION

Thus it will be seen that the present invention provides a number of novel features, including but not limited to:

1. the unique software feature of this invention implements a large number of PWM outputs in software which is significantly lower in cost and more general than the usual hardware solution;

2. a single processor is used to control hundreds of pixels and can be scaled to several thousand; and 3. a unique amalgamation of technologies is used—individual pixel addressing with serial shift registers, constant current drivers with high current LEDs, a single management processor, a charger with capacitor bank and strobe circuitry.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. An LED lamp comprising:
a plurality of LED strings, each LED string comprising a plurality of LEDs;
a plurality of constant current circuits for powering the plurality of LED strings, wherein one constant current circuit is provided for each LED string;
a plurality of shift registers for controlling the operation of the plurality of constant current circuits, wherein at least one shift register is provided for each LED string; and a microprocessor for supplying timing pulses to the plurality of shift registers for controlling operation of the plurality of constant current circuits, the timing pulses comprising a plurality of serial bit streams.

2. An LED lamp according to claim 1 wherein the microprocessor is configured to control the intensity of each of the plurality of LEDs in the plurality of LED strings by varying the timing pulses sent to the plurality of shift registers.

3. An LED lamp according to claim 2 wherein the microprocessor is configured to control the intensity of each of the plurality of LEDs in the plurality of LED strings using Pulse Width Modulation (PWM).

4. An LED lamp according to claim 1 wherein the microprocessor comprises a Single Instruction, Multiple Data stream (SIMD) processor.

5. An LED lamp according to claim 4 wherein the microprocessor uses saturated arithmetic.

6. An LED lamp according to claim 1 wherein the at least one shift register provided for each LED string comprises a single shift register.

7. An LED lamp according to claim 1 wherein the at least one shift register provided for each LED string comprises a plurality of shift registers configured in series and driven by a single output channel of the microprocessor.

8. An LED lamp according to claim 1 wherein the at least one shift register provided for each LED string comprises a plurality of shift registers configured in parallel and driven by a plurality of output channels of the microprocessor.

9. An LED lamp according to claim 1 further comprising a power supply and a plurality of switcher circuits, wherein one switcher circuit is provided for each LED string, and further wherein the microprocessor controls the plurality of switcher circuits to regulate the delivery of power to the plurality of LED strings.

10. An LED lamp according to claim 9 further comprising at least one capacitor for receiving power from the power supply and providing power to the plurality of switcher circuits.

11. An LED lamp according to claim 1 wherein the microprocessor is pre-programmed so as to supply appropriate timing pulses to appropriate ones of the plurality of shift registers so as to activate selected ones of the plurality of LEDs on the plurality of LED strings.

12. An LED lamp according to claim 1 further comprising a Graphical User Interface (GUI) communicating with the microprocessor for enabling a user to instruct the microprocessor so as to supply appropriate timing pulses to appropriate ones of the plurality of shift registers so as to activate selected ones of the plurality of LEDs on the plurality of LED strings.

13. An LED lamp according to claim 1 further comprising at least one trigger circuit communicating with the microprocessor.

14. An LED lamp according to claim 13 wherein the at least one trigger circuit communicates with a machine vision inspection system so as to coordinate operation of the LED lamp with the machine vision inspection system.

15. An LED lamp according to claim 1 further comprising a panel, wherein a plurality of LED strings are independently mounted to the panel such that one LED string may be removed from the panel without effecting operation of the remaining LED strings mounted to the panel.

16. A novel method for producing light, the novel method comprising:
providing an LED lamp comprising:
a plurality of LED strings, each LED string comprising a plurality of LEDs;
a plurality of constant current circuits for powering the plurality of LED strings, wherein one constant current circuit is provided for each LED string;
a plurality of shift registers for controlling the operation of the plurality of constant current circuits, wherein at least one shift register is provided for each LED string; and
a microprocessor for supplying timing pulses to the plurality of shift registers for controlling operation of the plurality of constant current circuits, the timing pulses comprising a plurality of serial bit streams; and
causing the microprocessor to supply appropriate timing pulses to appropriate ones of the plurality of shift registers so as to activate selected ones of the plurality of LEDs on the plurality of LED strings.

17. A lamp comprising:
a plurality of lighting strings, each lighting string comprising a plurality of light sources;
a plurality of powering circuits for powering the plurality of lighting strings, wherein one powering circuit is provided for each lighting string;
a plurality of shift registers for controlling the operation of the plurality of powering circuits, wherein at least one shift register is provided for each lighting string; and
a microprocessor for supplying timing pulses to the plurality of shift registers for controlling operation of the plurality of powering circuits, the timing pulses comprising a plurality of serial bit streams.

18. A lamp according to claim 17 wherein the light sources comprise LEDs.

19. A lamp according to claim 17 wherein the powering circuits comprise constant current circuits.

* * * * *